United States Patent [19]
Pettenon

[11] Patent Number: 5,750,023
[45] Date of Patent: May 12, 1998

[54] SELF-PRIMING PUMPING DEVICE FOR HYDRAULIC CIRCUITS

[75] Inventor: Paolo Pettenon, Cittadella, Italy

[73] Assignee: Sicce S.p.A., San Pietro in Gu', Italy

[21] Appl. No.: 598,314

[22] Filed: Feb. 8, 1996

[30] Foreign Application Priority Data

Feb. 24, 1995 [IT] Italy ................ PD95A0050

[51] Int. Cl.[6] .......... A01K 63/04; B01D 35/32; F04B 23/14; F04B 43/04
[52] U.S. Cl. ............ 210/169; 210/416.2; 417/199.2; 417/200; 417/201; 119/259
[58] Field of Search .................. 210/169, 416.2; 417/199.2, 200, 201; 119/259

[56] References Cited

U.S. PATENT DOCUMENTS

| 3,392,836 | 7/1968 | Willinger . |
|---|---|---|
| 3,512,646 | 5/1970 | Willinger . |
| 3,516,543 | 6/1970 | Willinger . |
| 3,578,880 | 5/1971 | Cygnor . |
| 3,825,374 | 7/1974 | Kondo . |
| 4,154,681 | 5/1979 | Shields . |
| 4,589,982 | 5/1986 | Willinger . |
| 4,818,188 | 4/1989 | Chan . |
| 5,188,516 | 2/1993 | Huang . |

FOREIGN PATENT DOCUMENTS

| 3402685 | 8/1985 | Germany . |
|---|---|---|
| 8716981 | 2/1988 | Germany . |

Primary Examiner—Thomas M. Lithgow
Attorney, Agent, or Firm—Guido Modiano; Albert Josif

[57] ABSTRACT

The pumping device comprises a pump driven by a motor having a stator and a permanent-magnet rotor located between polar expansions and connected to an impeller. A liquid suction duct and a liquid delivery duct are connected to the pump to define a hydraulic circuit. A reciprocating vacuum pump, for creating a negative pressure at the suction duct of the pump, has a resilient cylindrical element connected to a rigid cylindrical box-like element and defines therewith a chamber. The chamber has inlet and outlet valves connected to the hydraulic circuit through a poppet valve, and an arm-like member connected to the resilient element. An opposite end of the arm-like member supports a magnet located between poles of the stator of the motor, whereby to cause movement of the arm-like member and the resilient element for circulating fluid through the chamber via the inlet and outlet valves for priming the pump upon actuating the poppet valve.

12 Claims, 2 Drawing Sheets

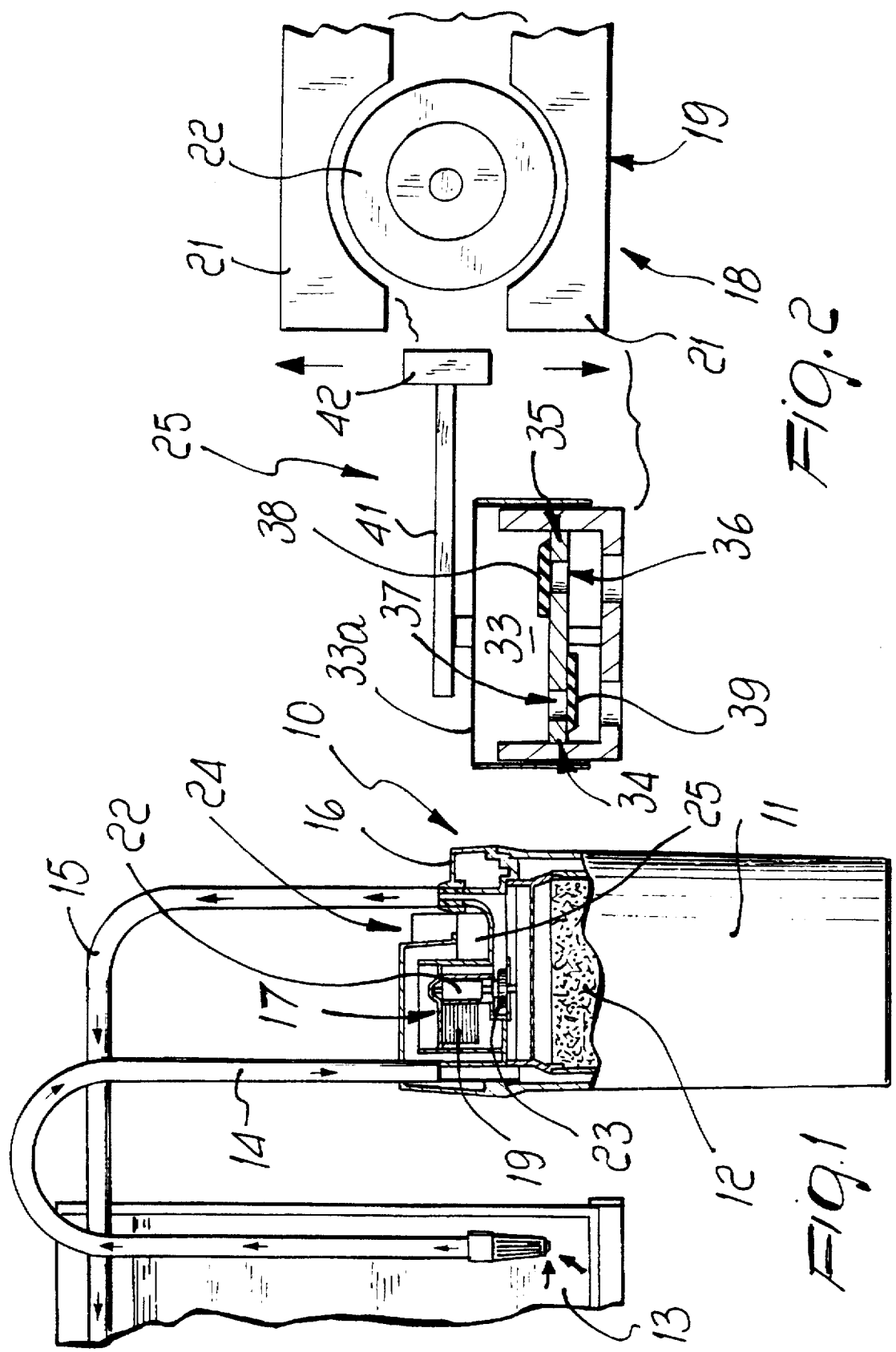

5,750,023

SELF-PRIMING PUMPING DEVICE FOR HYDRAULIC CIRCUITS

BACKGROUND OF THE INVENTION

The present invention relates to a pumping device for hydraulic circuits.

The pumping device can be used particularly but not exclusively in external filters for aquariums.

It is known that external filters for aquariums are constituted by a casing that contains filtering material, which retains the products that are suspended in the water of the aquarium.

In order to filter the water, it is circulated in a closed circuit, to which the filter is connected in series under a water head.

The head required for water circulation is provided by a pump accommodated in the lid of the filter.

In order to prime the pump for the first time or after an operation for cleaning or replacing the filtering material, it is necessary to fill the body of the filter with water, so that the impeller is completely submerged.

This is not a particularly easy or quick operation and also entails the danger of accidentally spilling water.

Filters provided with self-priming devices, which allow to perform this operation directly, have recently been marketed.

Although these filters avoid the usual awkward operations for filling the body of the filter with water drawn, from basins or other makeshift containers, by suction through the filter-tank return tube, they nonetheless have some limitations.

A first embodiment provides a filter with a prechamber. The filter impeller is located in the prechamber, that is provided with a spillway or overflow system.

The prechamber is filled by the user at pump startup with a cup of water, so as to completely submerge the impeller, which can thus be actuated and can produce a negative pressure inside the filter, whereby to draw water from the aquarium tank into the filter.

The main limitation of this device is that after the first stages of the operation of the pump, the level of the water in the prechamber decreases, so that the impeller operates while it is only partially submerged and achieves full-section flow in the aquarium-filter tube only after a few minutes.

For this reason, the operation of the pump is highly irregular during the first 10–15 minutes; in particular, there is a high noise level caused by the entrainment of air inside the pump delivery duct.

A second solution provides a filter that has, at the delivery tube, an auxiliary membrane pump (rubber pear-shaped bulb), which when compressed manually by the user allows to produce a negative pressure that causes part of the water contained in the aquarium to flow into the filter.

Although this system is rather effective, it is relatively awkward: in order to connect the auxiliary pump to the delivery tube it is necessary to lift the delivery tube from the tank, connect the suction of the auxiliary pump to said delivery tube, compress the auxiliary pump until priming is achieved, and then disconnect the auxiliary pump from the tube and immerse the end of said tube in the tank before the water reaches said end.

SUMMARY OF THE INVENTION

The aim of the present invention is to provide a self-priming, non-submersed hydraulic pumping device that eliminates the drawbacks mentioned above in known types.

Within the scope of this aim, a consequent primary object is to provide a device in which self-priming is particularly quick.

Another important object is to provide a hydraulic pumping device in which the pump operates in a regular fashion from the very beginning of its startup.

Another important object is to provide a hydraulic pumping device in which priming can be activated in a particularly simple manner.

Another object is to provide a device that is constructively simple and compact.

Another object is to provide a device that prevents water loss.

Another object is to provide a device that can be manufactured with conventional equipment and facilities.

With this aim, these and other objects in view, there is provided a self-priming pumping device for hydraulic circuits, characterized in that it comprises a pump whose power plant is at least partially not submersed and a volumetric suction machine that is associated therewith and produces a negative pressure at the suction.

BRIEF DESCRIPTION OF THE DRAWINGS

Further characteristics and advantages of the invention will become apparent from the detailed description of an embodiment thereof, illustrated only by way of non-limitative example in the accompanying drawings, wherein:

FIG. 1 is a partially cutout view of an external filter for aquariums, connected to an aquarium, provided with the pumping device according to the invention;

FIG. 2 is a schematic view of a reciprocating suction machine included in the device;

DESCRIPTION OF THE PREFERRED EMBODIMENTS

Figure 3:
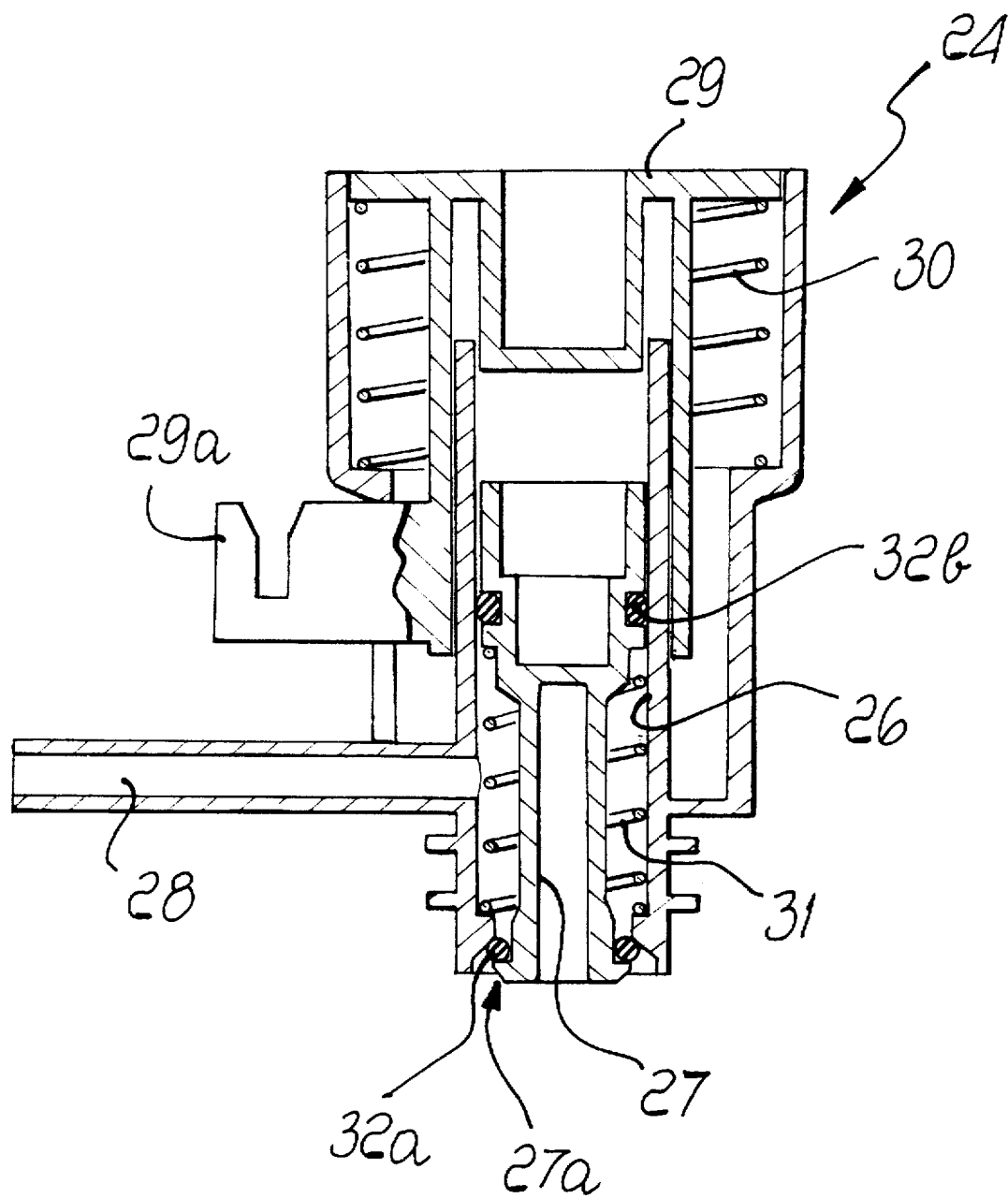
FIG. 3 is a sectional view of the actuation means of the machine of FIG. 2.

With reference to the above figures, an external filter for aquariums is generally designated by the reference numeral 10 and comprises a hermetic container 11 that accommodates filtering masses 12 and is placed under a water head with respect to an aquarium 13; the inside of said container is connected to said aquarium respectively with a suction duct 14 and a delivery duct 15, thus forming a hydraulic circuit.

A centrifugal pump 17 is accommodated inside the lid 16 of the container 11 and has a synchronous motor 18 with permanent magnets; said motor 18 is constituted by a stator 19 with a metal lamination pack, with a winding that is not shown in the figures, and with polar expansions 21, between which there is a permanent-magnet rotor 22 that is connected to the impeller 23.

A cylindrical body 24 is applied to the lid 16 for example by means of a bayonet coupling, not shown in the figures; a volumetric suction machine, generally designated by the reference numeral 25 and adapted to create a negative pressure at the suction of the pump 17, is fixed on the outer surface of said cylindrical body 24.

The seat 26 of a poppet valve 27 is formed in the lower part of said cylindrical body 24; said valve is opened during priming to connect the suction duct 28 of the machine 25 to the inside of the filter 10 and is instead closed during the normal operation of said filter 10, to prevent water contained therein from rising back toward the volumetric machine 25.

A pushbutton 29 is arranged on the upper part of the cylindrical body 24 and is adapted to operate the priming system by pressing on the poppet valve 27.

Indeed, by pressing said pushbutton 29, the locking system of the volumetric machine 25 is disengaged, as better explained hereinafter, and the poppet valve 27 is opened, whereas by releasing the pushbutton 29 locking is engaged and the poppet valve 27 is closed.

The pushbutton 29 can also be provided with a device for locking it in the inactive condition, constituted for example by a retractable pin, not shown in the figures, slideably connected to the cylindrical body 24 and releasably engageable in a seat formed in the pushbutton 29.

The pushbutton 29 and the poppet valve 27 are provided with separate springs, respectively 30 and 31, which are accommodated in the cylindrical body 24 and are adapted to produce an elastic return of the pushbutton 29 and the poppet valve 27.

The poppet valve 27 is also equipped with a sealing ring of the O-ring type 32a, which is associated with the shutter 27a, and is also equipped with a similar ring 32b on the body.

Said volumetric suction machine 25 includes a resilient member, such as a cylindrical rubber element 33a that forms a chamber 33 and defines an open end at one of its flat faces; the open end of said cylindrical element 33a is inserted on a rigid cylindrical box-like element 34 so that a wall 35 that lies inside the element 34 constitutes the lower flat face of said chamber 33 (which thus acts alternatively as a suction chamber and as a delivery chamber).

A suction port 36 and a delivery port 37 are formed in the wall 35, and each port is provided with a one-way or non-return membrane valve, respectively 38 and 39.

The valves 38 and 39 are connected to the wall of the rigid box-like element 34.

The suction port 36 is connected, by means of the duct 28, to the seat of the spring 31 of the poppet valve 27.

The opening of the poppet valve 27 therefore connects the inside of the filter 10 to the suction of the volumetric machine 25.

The operation of the volumetric machine 25 arises from the variation in the volume of the rubber chamber 33 that is generated by the oscillation of a lamina or arm-like member 41, rigidly coupled in a cantilevered fashion over the center of said chamber.

The lamina 41 is made to oscillate by the action of the magnetic flux that is produced by the motor 18 on a magnet 42 fixed to the free end of the lamina 41 and arranged between the poles 21 of the stator 19.

When the chamber 33 is extended, the air is drawn in through the suction duct and enters said chamber (the intake valve allows the air to enter but not to exit from said duct); when the chamber 33 is compressed, the air is pushed through the discharge valve into the delivery duct and is discharged outside the filter, thus defining a reciprocating vacuum pump.

A hook 29a is fixed to the button 29 and, when inactive, partially surrounds the lamina 41 and locks it; when the hook 29a is moved by pressing on the pushbutton 29, it allows said lamina to move freely.

Therefore, when the motor 18 and accordingly the pump 17 are switched on, after the release of the hook 29a connected to the pushbutton 29, the magnet 42 starts to vibrate, activating the volumetric machine 25 as well.

By pressing the pushbutton 29 further, the machine 25 is connected to the suction inlet of the pump 17, which is placed under a negative pressure, drawing water from the aquarium 13 and performing priming.

In practice it has been observed that the intended aim and objects of the present invention have been achieved, providing a self-priming non-submersed hydraulic pumping device that permits particularly easy pump priming achieved by means of the simple pressing of a pushbutton.

Priming is also particularly quick, since in less than ten seconds a full-section flow is produced in the suction duct of the pump, allowing to fill the filter quickly.

The pump therefore operates in a regular fashion from the very beginning.

The fact that the volumetric machine associated with the pump is not actuated by a specifically provided motor, but by the same motor as the pump, thus allowing the device to be particularly simple from a constructive point of view.

The compact size of the device and the fact that all components thereof are contained inside the lid of the filter should also be stressed.

One should also note its extreme safety in operation, since the two automatic return springs 30 and 31 ensure the disengagement of the machine 25 and the closure of the poppet valve 27 once priming has occurred.

Finally, the fact that the safety device prevents water losses from the filter 10 caused by accidental pressing of the pushbutton 29 should also be noted.

The invention thus conceived is susceptible of numerous modifications and variations, all of which are within the scope of the inventive concept.

All the details may furthermore be replaced with other technically equivalent elements.

The device may of course also be provided for use in pumping operations different from those in aquariums, in any application in which a non-submersed pump is present.

In practice, the materials employed, so long as they are compatible with the contingent use, as well as the dimensions, may be any according to the requirements.

What is claimed is:

1. An apparatus comprising an aquarium and an external aquarium filter, said external aquarium filter accommodating filtering masses in a hermetic container placed under a water head with respect to an aquarium;

a lid for said container;

a suction duct and a delivery duct respectively connecting said aquarium with said container;

a pump accomodated inside said lid, said pump having an electric motor which is at least partially not submersed; and a volumetric suction machine connected to said lid and driven by said electric motor for producing a negative pressure suction for priming said pump, said volumetric suction machine having a suction inlet connected to a suction inlet of said pump by means of ducts that are controlled by valve means.

2. The apparatus according to claim 1, wherein said electric motor is a synchronous permanent-magnet motor.

3. The apparatus according to claim 1, wherein said volumetric suction machine is a reciprocating vacuum pump.

4. The apparatus according to claim 3, wherein said reciprocating vacuum pump is actuated by magnetic flux produced by a stator of said motor.

5. The apparatus according to claim 1, wherein said volumetric suction machine is constituted by a hollow rubber element that forms a chamber whose volume is changed by the oscillation of a lamina rigidly coupled to one of its walls, a magnet being fixed to the free end of said lamina and being located close to poles of the stator of said motor.

6. The apparatus according to claim 1, wherein said valve means comprise a poppet valve.

7. The apparatus according to claim 6, wherein said poppet valve is actuated by a pushbutton associated with a return spring.

8. The apparatus according to claim 5, wherein said oscillating lamina is normally locked by a hook that is connected to said pushbutton, pressure on said pushbutton causing the translatory motion of said hook and the release of the lamina.

9. The apparatus according to claim 8, wherein said pushbutton connected to said lamina locking hook and said poppet valve are connected to separate return springs.

10. The apparatus according to claim 7, wherein said pushbutton is associated with a retention element to lock it in an inactive configuration.

11. The apparatus according to claim 7, wherein said pushbutton and said poppet valve are contained in a cylindrical body connected to said pump.

12. The apparatus according to claim 11, wherein said poppet valve and said pushbutton of said device are accommodated in a cylindrical body fixed to said lid.

* * * * *